United States Patent [19]

Boisvert, Jr. et al.

[11] 3,758,759

[45] Sept. 11, 1973

[54] APPARATUS FOR DETERMINING PARTIAL MEMORY CHIP CATEGORIES

[75] Inventors: Conrad J. Boisvert, Jr.; Anthony L. Mandia, both of Wappingers Falls, N.Y.

[73] Assignee: Cogar Corporation, Wappingers Falls, N.Y.

[22] Filed: Jan. 13, 1972

[21] Appl. No.: 217,458

[52] U.S. Cl. . 235/153 AC, 235/153 AM, 324/73 R, 340/172.5

[51] Int. Cl. .......................................... G11c 29/00

[58] Field of Search .............. 235/153 AC, 153 AM; 340/172.5, 174 ED, 174 TC; 324/73 AT, 73 R

[56] References Cited

UNITED STATES PATENTS

| | | | |
|---|---|---|---|
| 3,444,526 | 5/1969 | Fletcher | 340/172.5 |
| 3,644,899 | 2/1972 | Boisvert, Jr. | 340/172.5 |
| 3,653,003 | 3/1972 | Hemdal | 340/172.5 |
| 3,659,088 | 4/1972 | Boisvert, Jr. | 235/153 AK |
| 3,665,175 | 5/1972 | Bouricius et al. | 235/153 AM |
| 3,681,757 | 8/1972 | Allen et al. | 340/172.5 |

*Primary Examiner*—Charles E. Atkinson
*Attorney*—Harry M. Weiss et al.

[57] ABSTRACT

There is disclosed an apparatus for determining partial memory chip categories. In the case of 128-cell chips having seven address bits, there are fourteen partial memory chip categories; permanently addressing any one of the seven address lines with a 1 or a 0 produces an effective 64-cell chip, any cell of which can be selected depending upon the address bits extended to the other six address lines. Each address bit of each bad cell on the chip causes a latch to be set as soon as it is determined that the cell is bad. Depending on its value, one of two respective partial chip categories is eliminated. After all cells have been tested the partial chip categories which have not been eliminated are those applicable to the chip, and they can be determined immediately from the settings of the latches.

12 Claims, 1 Drawing Figure

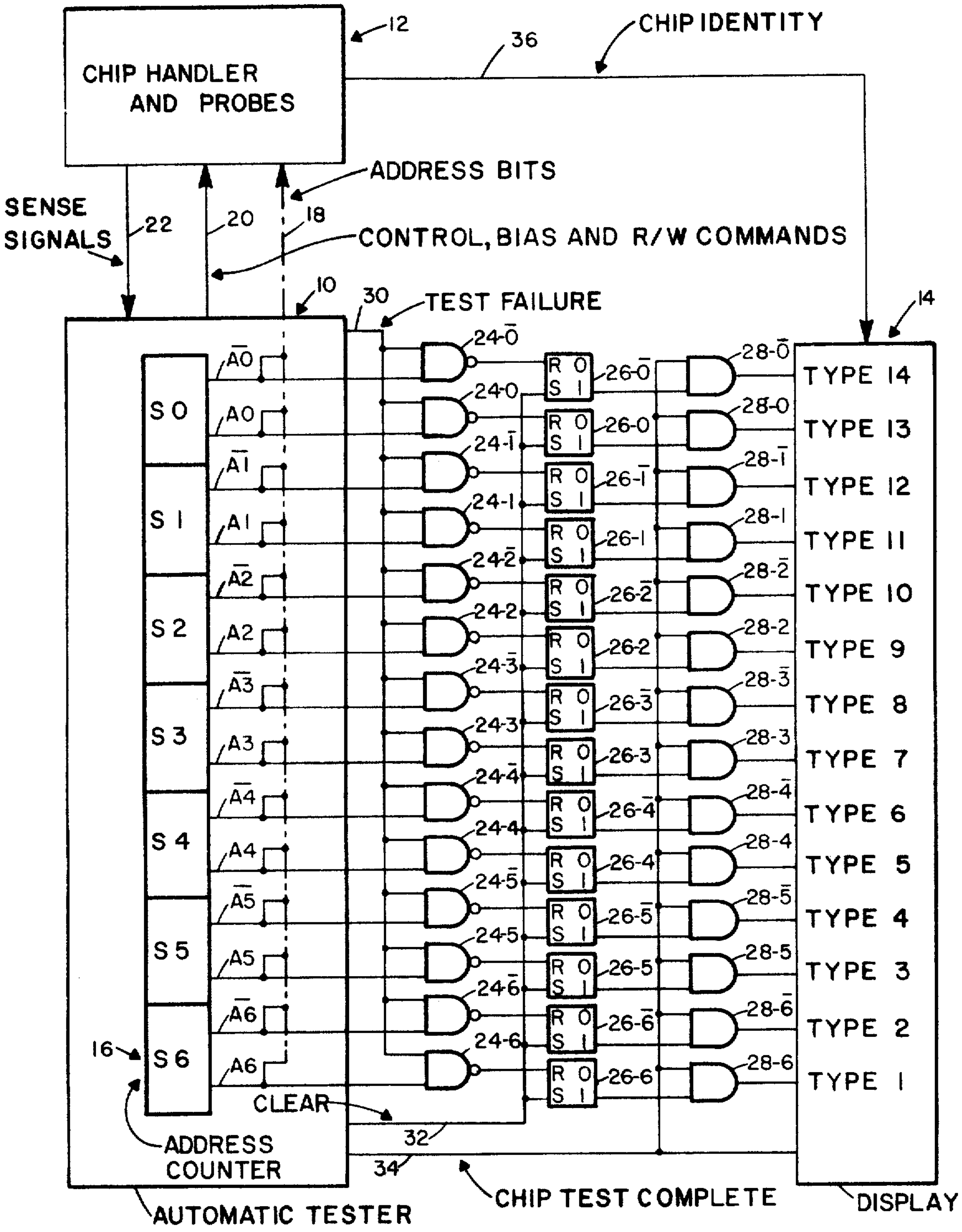
CHIP HANDLER AND PROBES
12
CHIP IDENTITY
36
ADDRESS BITS
SENSE SIGNALS
22
20
18
CONTROL, BIAS AND R/W COMMANDS
10
30
TEST FAILURE
14
S 0
S 1
S 2
S 3
S 4
S 5
S 6
16
TYPE 14
TYPE 13
TYPE 12
TYPE 11
TYPE 10
TYPE 9
TYPE 8
TYPE 7
TYPE 6
TYPE 5
TYPE 4
TYPE 3
TYPE 2
TYPE 1
CLEAR
32
ADDRESS COUNTER
34
CHIP TEST COMPLETE
AUTOMATIC TESTER
DISPLAY

APPARATUS FOR DETERMINING PARTIAL MEMORY CHIP CATEGORIES

This invention relates to partial memory chips, and more particularly to apparatus for determining partial memory chip categories.

A typical semiconductor integrated circuit memory chip contains a plurality of memory cells and a sufficient number of address lines to enable the selection of a particular cell. For example, in the case of a chip having 128 cells, seven address bits are required to identify any given cell. In a typical memory array, the same address bits are extended to each chip; the same numbered cell is identified in each chip. In order to select particular cells in the overall array (to operate upon only those cells in a predetermined word), each chip is provided with a chip select conductor. The only cells which are operated upon are those which are identified by the common address bits and which are contained on chips whose chip select conductors are energized.

It is often found that not all cells in a particular chip are functional. There are a variety of systems commercially available for performing individual tests on each cell of a chip being tested. With the use of such automated equipments it is possible to determine which cells are not functional. Standard test equipments can generally be programmed so that different test sequences are performed on different types of chips, thus not requiring a separate test system for every type of chip produced.

Despite great advances in semiconductor technology, it is often found that one or more cells on a memory chip are not functional. Rather than to throw away such a chip, it has been suggested to use only some of the operative cells on the chip. For example, consider the case in which a single cell on a 128-cell chip is inoperative. The chip can be used in a memory array provided that the address conductors never identify the inoperative cell. This can be accomplished by using only six of the seven address conductors and utilizing the chip in an array in which each chip has only 64 functional cells. Each address bit of the seven address bits serves to divide the chip into two parts, each containing 64 cells. Any one of the seven address conductors can be wired permanently to a fixed potential (low or high, that is, a 0 or 1) so that the address bits on the other six address conductors identify one of the 64 cells in the group containing 64 operative cells. In effect, by wiring one of the address conductors to a fixed potential, the chip is converted to a chip of half the capacity.

It is apparent that if a single cell in a 128-cell chip is inoperative, the chip can be used as a partial chip in any one of seven different ways. For example, suppose that the address of the inoperative cell is 1001001, where a 1 represents a high potential on the respective address conductor and a 0 represents a low potential on the respective address conductor. To preclude addressing of the inoperative cell, all that is required is to insure that at least one of the seven address conductors cannot be addressed with the respective bit in the address of the cell. For example, if any one of the first, fourth and seventh address conductors is wired to a low potential, the inoperative cell cannot possibly be operated upon because the seven address bits cannot all be of the necessary values to identify the cell. Similarly, if at least one of the second, third, fifth and sixth address conductors is permanently wired to a high potential, the inoperative cell can never be addressed. Whichever address conductor is permanently wired to the potential which will preclude addressing of the inoperative cell, the six address bits supplied to the other six address conductors enable 64 good cells to be addressed.

It is apparent that in the case of 128-cell chips, there are 14 "partial" categories. Each category is associated with a respective one of the seven address conductors being permanently wired to a high or low potential. (It is possible to permanently wire two or more of the address conductors to fixed potentials in which case the 128-cell chip is converted to a chip having only 32, 16 or fewer operative cells, but in the illustrative embodiment of the invention the permanent addressing of only one of the address conductors is considered.) In the usual fabrication of a memory system, the chips are contained in modules (more than one chip can be included in the same module) and the modules are attached by pin connections to a circuit board. Typically, a printed circuit board used in conjunction with 128-cell chips for deriving a memory in which only 64 cells on each chip are utilized would have a wiring pattern such that chips of the same partial category would be used on the board. For example, the board might be designed such that address conductor 4 would be connected to a low potential while only the other six address conductors would be addressed high or low. In such a case, the partial chips which would have to be used on the board would be those in which 64 good cells can be addressed when the fourth address conductor is held at a low potential. The technique of using partial chips in this manner is disclosed in application Ser. No. 45,116, now U.S. Pat. No. 3,681,757 which was filed on June 10, 1970 in the names of Allen et al.

For maximum flexibility in production it would be highly desirable to identify all partial categories of each chip. In the case of a 128-cell chip having only a single inoperative cell, the chip can be used in any one of seven different types of arrays, that is, it can be used on seven of the fourteen possible circuit boards — namely, the seven boards which permanently address one of the seven address conductors with a bit different from the bit necessary to address the inoperative cell. It is possible for a chip having only two inoperative cells to be incapable of use as a partial chip. For example, if cells 1001001 and 0110110 (with complementary addresses) are both inoperative, it is apparent that no matter which of the seven address conductors is tied to a high or low potential, the cycling of the other six address conductors will result in the addressing of one of the two inoperative cells. Depending on the number of cells which are inoperative on any 128-cell chip, and their addresses, it is possible for the chip to be identified in anywhere from no partial chip categories to seven partial chip categories of the total of fourteen categories. If the chip is identified by three such categories, for example, it can be used with any one of three different types of 64-cell chip arrays. (In some cases, chips of different categories can be used on the same circuit board but this requires additional wiring of pins to high or low potentials; but even in this case it is necessary to know the partial categories of each chip used in the array and it is therefore highly desirable to know the partial categories of all chips so that they can be used in any category in which there is a need for more chips.)

The straightforward approach to the determination of partial chip categories is for the automatic tester to apply a fixed potential to one of the seven address conductors and to then cycle the other six address conductors through a total of 64 states. Each of the addressed cells is tested, and if it is determined that they are all good the chip can be identified in the category in which the selected address conductor is permanently wired to the fixed potential. It is apparent that this apparoach requires 14 different test sequences, each sequence including the complete testing of 64 cells. Fourteen sequences are required because each of the seven address conductors must be connected to both a high and a low potential while the other six address conductors are cycled. This is an exceedingly time-consuming process.

In Boisvert application Ser. No. 59,109, now U.S. Pat. No. 3,644,899 which was filed on July 29, 1970 and entitled "Method for Determining Partial Memory Chip Categories," there is disclosed a method for very rapidly determining partial memory chip categories. All of the cells on a chip can be tested in a conventional manner without applying a fixed potential to one of the address conductors while all of the others are cycled in order to test for partial chip categories. The testing of the cells is performed without partial chip category considerations. During the testing, the inoperative cells are identified (as all seven address bits are cycled in the case of 128-cell chips). No further tests are performed to determine the partial chip categories. Instead, they are determined solely by a computer (generally a part of the tester in the first place) from the addresses of the inoperative cells. The data processing is very fast since it does not involve actual testing of cells. In fact, following the testing of a chip, while the tester is causing the next chip to be moved underneath the test probes, the computer determines the partial chip categories and controls their print-out. In a typical case, the algorithm for determining the partial memory chip categories is finished by the time the next chip is in place; thus, conventional test sequences can be utilized and yet a list of partial memory chip categories for each chip can be provided with no additional time required for the processing of each chip.

The Boisvert algorithm can be understood by first associating the partial categories with the seven address lines (in the case of 128-cell chips). The address lines are numbered 0 through 6 and have respective binary weights 1, 2, 4, 8, 16, 32 and 64. A chip is of partial category (or type) 1 if when address line 6 is held at a high potential (1) and the other six address lines are cycled, 64 good cells are addressed. Similarly, the chip is of partial type 2 if when address line 6 is held at a low potential (0) and the other six address lines are cycled, 64 good cells are identified.

A chip is of partial type 3 if when address line 5 is held at a high potential (1) the other six address lines can be cycled to address 64 good cells. Similarly, if address line 5 is permanently connected to a low potential (0) and the other six address lines can be cycled to address 64 good cells, the chip is of partial type 4. The following table associates each partial category with its respective address line and a particular permanent value for that line:

| | | | | | | | | |
|---|---|---|---|---|---|---|---|---|
| Address line | 0 | 1 | 2 | 3 | 4 | 5 | 6 | |
| Binary weight | 1 | 2 | 4 | 8 | 16 | 32 | 64 | |
| Partial type | 13 | 11 | 9 | 7 | 5 | 3 | 1 | Address bit value 1. |
| | 14 | 12 | 10 | 8 | 6 | 4 | 2 | Address bit value 0. |

Consider a particular inoperative cell having an address 1001001. A chip of partial type 1 is a chip in which if address line 6 is held at a high potential the other six address lines can be cycled to identify 64 good cells. The converse of this statement is that if any cell is no good and its address includes a 1 in address bit position 6, then the entire chip cannot be utilized as a partial type 1. Since the most significant address bit for the cell under consideration is a 1 and the cell is no good, partial category 1 is eliminated.

Similarly, because the fifth address bit is a 0, the chip cannot be utilized in partial category 4. Referring to the chart above, if a chip is of partial type 4 it means that the fifth address conductor can be tied to a low potential (0) while the other six address conductors are cycled to address 64 good cells. In the case of the chip under consideration, if address line 5 is tied to a low potential, as the other six lines are cycled eventually the address will be 1001001 and an inoperative cell will be identified. For this reason, the chip under consideration with an inoperative cell having an address 1001001 cannot be contained in partial category 4. A further analysis of this type in conjunction with the chart above immediately reveals that the chip under consideration cannot be contained in categories 1, 4, 6, 7, 10, 12 and 13.

The first time an inoperative cell is detected, seven of the fourteen partial categories are eliminated. If the cell with a complementary address is also inoperative, the chip cannot be utilized in any partial chip configuration even though there may be only two inoperative cells. In the example above, if the address of the second inoperative cell is 0110110, partial categories 2, 3, 5, 8, 9, 11 and 14 are eliminated. In such a case, there are no partial categories left.

On the other hand, suppose that the second inoperative cell has an address 1001011. With reference to the chart above, the partial categories which are eliminated by this inoperative cell are categories 1, 3, 6, 7, 10, 12 and 13. The first inoperative cell eliminated six (1, 6, 7, 10, 12 and 13) of these seven partial categories. Thus the two cells together eliminate eight of the fourteen possible categories. If no other cells are inoperative, the chip can be classified in categories 2, 5, 8, 9, 11 and 14.

It is thus apparent that all that is required to determine all of the partial chip categories for a particular chip are the addresses of the inoperative cells. The Boisvert algorithm is predicated on the following observation: a chip of partial type 7, for example, is a chip in which, if address line 3 is held at a high potential, the cycling of the other six address lines will identify 64 good cells. Conversely, if any cell is no good and bit 3 in its address is a 1, the entire chip cannot function as a partial type 7 chip. Similar remarks apply to each of the other 13 partial categories. Thus, simply by operating on the addresses of the inoperative cells (in a sequence described in the Boisvert application), it is possible to identify all partial chip categories without performing any tests on the chip other than the conventional tests used to identify good and bad cells.

The Boisvert system can be practiced on an automatic tester which is suitable for testing memory chips. A particular tester which can be used is the PAFT II (programable automatic function tester) manufactured by the Redcor Corporation of Canoga Park, Calif., used in conjunction with Electroglas test probes. The PAFT II tester performs both functional and parametric tests on MOS/LSI devices by generating (under computer control) program-selectable clocks, strobes, input/output patterns, and voltage levels that automatically execute pass/fail tests on a given device under test. Test programs can be generated by any one of the program language processors included in the Redcor standard software package. The PAFT II system includes an RC 70 general purpose digital computer, and the system is thus ideally suited for executing the algorithm to determine partial categories while the chip previously tested is being removed and a new chip is being moved under the test probes.

Although the Boisvert system allows partial chip categories to be determined in a simple manner, it does require the storage of the program instructions in the computer memory. It would be highly advantageous to provide for the identification of partial chip categories without requiring the execution of a program of the type described above.

It is a general object of our invention to provide apparatus for identifying partial chip categories during the course of the testing of a chip, the cost of the apparatus which is required in addition to the automatic tester being almost negligible in comparison with the cost of the overall system, and the partial chip categories being determined automatically during the course of the testing of the cells on the chip without requiring any additional data processing.

In accordance with the principles of our invention, a plurality of latches are provided, with each latch corresponding to a respective one of the possible partial chip categories. Prior to the testing of a new chip, all of the latches are set to indicate that their respective partial chip categories are valid. A conventional automatic tester includes an address counter, the stages of which identify a particular cell to be tested. The outputs of the address counter stages are extended to respective one of the latches. However, the states of the address counter stages have no effect on the latches until a bad cell is detected during the course of the testing. As soon as a bad cell is detected, the counter stage address bits for the cell directly control the resetting of the respective latches so that those partial chip categories which should be eliminated (and which have not yet been eliminated) are eliminated. After all of the cells on the chip have been tested, the valid partial chip categories are those whose respective latches are still set in the initial state. Accordingly, all that is required is to read out the states of the latches in order to determine the partial chip categories applicable to the chip.

It is a feature of our invention to provide a plurality of latches associated with respective partial chip categories, to initially set each of the latches in a state representing an applicable category, to reset those latches associated with inapplicable categories directly from the address bits used to identify a bad cell during the testing sequence, and to determine the remaining applicable categories directly from the latches at the end of the testing sequence.

Further objects, features and advantages of the invention will become apparent upon consideration of the following detailed description in conjunction with the drawing which depicts the illustrative embodiment of the invention.

Automatic tester 10 is of a conventional type and operates in conjunction with chip handler and probes 12, the latter unit also being any of the conventional types. The automatic tester includes an address counter 16 which includes seven stages S0–S6 in the case of 128-cell chips which are to be tested. The cell on which an operation (read or write) is to be performed is identified by the address in the counter, the seven address bits being extended over cable 18 to the chip handler and probes. Each bit is represented on a pair of conductors such as a A0, $\overline{\textbf{A0}}$. A 1 in the least significant bit position (S0) results in a high potential on conductor A0 and a low potential on conductor $\overline{\textbf{A0}}$, while a 0 is represented by a low potential on conductor A0 and a high potential on conductor $\overline{\textbf{A0}}$. The automatic tester extends control, bias and read/write commands to the chip handler and probes over cable 20, and the sense signals which result from the testing of a cell are transmitted back to the automatic tester over cable 22. The automatic tester checks whether the sense signals represent a bit value which is expected. In the event of a failure of a test by a particular cell, conductor 30 is pulsed prior to advance of the address in counter 16.

Display 14 is depicted only symbolically; it may be a visual display, a print-out, etc. One input to the display is the identity of the chip being tested, the chip number being extended over cable 36 from the chip handler and probes to the display so that a record may be made of it. Another input to the display is a "chip test complete" signal on conductor 34, the automatic tester pulsing conductor 34 at the end of the testing of any chip. The pulsing of conductor 34 controls the making of a record and also energizes one input of each of the 14 gates 28–0 through 28–$\overline{6}$; up to a maximum of 14 gates may operate at this time if their second inputs are energized. The chip-test-complete signal on conductor 34 triggers the display so that a record may be made of the chip number and the outputs of gates 28–0 through 28–$\overline{6}$. If gate 28–0 operates, it is an indication that the least significant bit in the seven-bit address can be a 1 permanently, with the cycling of the six other address bits necessarily identifying 64 good cells. Similarly, if gate 28–$\overline{0}$ operates, it is an indication that the least significant address line can be tied to a potential which represents a 0, that is, partial type 14 is applicable to the chip.

Prior to the start of the testing of any chip, conductor 32 is pulsed by automatic tester 10. The "clear" pulse on this conductor sets each of the 14 latches 26–0 through 26–$\overline{6}$ in the 1 state. Each latch corresponds to a respective partial category, and if by the end of the testing of the chip the latch is still in the 1 state, it is an indication that the respective partial category is applicable to the chip. It is for this reason that all of the latches are set in the 1 state prior to the testing of the cells; it is during the course of the testing that those latches associated with inapplicable partial categories are switched to the 0 state so that their respective gates 28–0 through 28–$\overline{6}$ are not energized when the chip-test-complete conductor 34 is pulsed at the end of the testing sequence.

Any one of the latches can be reset in the 0 state if its R input goes low. The output of each of gates 24–0 through 24–$\overline{6}$ is normally high, the output going low only when both inputs to the gate go high. Since conductor 30 is normally low, in the absence of the detection of a test failure none of the gates operate and the states of no latches are switched. However, suppose that stage so, which represents the least significant bit in the address of the cell being tested, is in the 1 state when a test failure is detected. When this bit is 1, conductor A0 is high and the pulse on conductor 30 which indicates the test failure results in the operation of gate 24-0. Gate 24–$\overline{0}$ does not operate because conductor $\overline{A0}$ is low in potential. When the output of gate 24–0 goes low, latch 26–0 is switched from the 1 state to the 0 state. During the remainder of the testing of the chip, the output of gate 24–0 may go low when additional test failures are detected. But once latch 26–0 is set in the 0 state, it remains there; it cannot be switched back to the 1 state since this can be done only prior to the testing of a cell when clear conductor 32 is pulsed. Consequently, at the end of the testing when conductor 34 is pulsed, gate 28–0 does not operate because the 1 output of latch 26–0 is low. The input designated "type 13" in display 14 is not energized and a record is not made that partial category 13 is applicable to the chip. This is due to the fact that there is at least one bad cell whose least significant address bit is a 1.

On the other hand, if the least significant bit in the address of a bad cell is a 0, conductor $\overline{A0}$ is high in potential rather than conductor A0 when test failure conductor 30 is pulsed. In this case, it is gate 24–$\overline{0}$ whose output goes low and latch 26–$\overline{0}$ whose state is switched. Consequently, partial category 14 is eliminated.

In a similar manner, whenever a bad cell is detected seven of the fourteen gates 24–0 through 24–$\overline{0}$ have outputs which go low. When the first bad cell is detected, seven of the latches have their states switched from 1 to 0. Thereafter, additional latches may have their states switched from 1 to 0 as further bad cells are detected, but no latch can have its state switched back to 1. Consequently, at the end of the testing sequence, the state of the latches represent the applicable partial categories. For example, if the only latches which remain in the 1 state are latches 26–0 and 26–$\overline{6}$, it is an indication that only partial categories 13 and 2 are applicable to the chip, that is, the chip can be included in a system in which either the least significant address bit is held fixed at a value of 1, or the most significant address bit is held fixed at a value of 0. It is apparent that the hardware which is required, over and above the hardware included in the automatic tester and the chip handler and probes, is minimal. It is not necessary to execute a program in order to determine the partial categories applicable to any tested chip. Instead, the information is made available automatically in the latches, and can be read out quickly and displayed immediately at the end of the testing sequence. The determination of the partial categories is a continuous process, with the states of the latches being up-dated continuously during the course of the testing.

Although the invention has been described with reference to a particular embodiment, it is to be understood that this embodiment is merely illustrative of the application of the principles of the invention. For example, the extension of the system to 256-cell chips, by providing an additional two latches and associated gates for an eighth stage of the address counter, will be apparent to those skilled in the art. Thus it is to be understood that numerous modifications may be made in the illustrative embodiment of the invention and other arrangements may be devised without departing from the spirit and scope of the invention.

What we claim is:

1. A chip testing system for automatically determining the partial memory categories, each having (N−1) effective address bits, applicable to a memory chip having $2^N$ memory cells identifiable by N address bits, comprising means for representing N address bits of a cell to be tested, testing means for controlling the execution of a test operation on the cell identified by said represented address bits, 2N latch means each associated with one of the 2N partial memory categories with pairs of said latch means being associated with respective opposite bit values in a respective bit position in an N-bit address, means for setting all of said latches in a first state prior to the testing of a chip, means responsive to said testing means detecting a bad cell for setting in a second state one of the two latches in each of the N pairs depending upon the value of the bit in the respective bit position of the address of the cell, and means for registering those latch means which are still in said first state at the end of the testing of said chip.

2. A chip testing system in accordance with claim 1 wherein said latch means are set in said second state in accordance with the address of a bad cell before the address bits in said representing means are changed to identify another cell.

3. A chip testing system for automatically determining the partial memory categories, each having (N−1) effective address bits, applicable to a memory chip having $2^N$ memory cells identifiable by N address bits, comprising means for representing N address bits of a cell to be tested, testing means for controlling the exceution of a test operation on the cell identified by said represented address bits, 2N latch means each associated with one of the 2N partial memory categories with pairs of said latch means being associated with respective opposite bit values in a respective bit position in an N-bit address, means for setting all of said latches in a first state prior to the testing of a chip, means responsive to said testing means for setting in a second state each latch means whose respective bit value was represented in the respective bit position in the address of at least one bad cell, and means for registering those latch means which are still in said first state at the end of the testing of said chip.

4. A chip testing system in accordance with claim 3 wherein said latch means are set in said second state in accordance with the address of a bad cell before the address bits in said representing means are changed to identify another cell.

5. A chip testing system for automatically determining the partial memory categories applicable to a memory chip having a group of memory cells identifiable by a plurality of address bits comprising means for representing address bits of a cell to be tested, testing means for controlling the execution of a test operation on the cell identified by said represented address bits, registering means for representing partial memory categories for said chip to be eliminated, means responsive to said testing means for operating each of said registering means when its respective partial memory category must be eliminated by the represented address of at least one bad cell, and means for determining the partial memory categories applicable to a chip after it is tested from said registering means.

6. A chip testing system in accordance with claim 5 wherein said registering means are operated in accordance with the address of a bad cell before the address bits in said representing means are changed to identify another cell.

7. A chip testing system for automatically determining the partial operational categories applicable to a semiconductor chip having a group of logic circuits identifiable by a plurality of address bits comprising means for representing address bits of a logic circuit to be tested, testing means for controlling the execution of a test operation on the logic circuit identified by said represented address bits, registering means for representing partial memory categories for said chip to be eliminated, means responsive to said testing means for operating each of said registering means when its respective partial operational category must be eliminated by the represented address of at least one bad logic circuit, and means for determining the partial operational categories applicable to a chip after it is tested from said registering means.

8. A chip testing system in accordance with claim 7 wherein said registering means are operated in accordance with the address of a bad logic circuit before the address bits in said representing means are changed to identify another logic circuit.

9. A system for automatically determining the partial memory categories applicable to a memory chip having a group of memory cells identifiable by a plurality of address bits comprising means for representing address bits of a cell, registering means for representing partial memory categories for said chip to be eliminated, means responsive to said testing means for operating each of said registering means when its respective partial memory category is indicated to be inapplicable to a memory chip by the represented address of at least one bad cell on the memory chip, and means for determining the partial memory categories applicable to the memory chip from said registering means.

10. A chip testing system in accordance with claim 9 wherein said registering means are operated in accordance with the address of a bad cell before the address bits in said representing means are changed to identify another cell.

11. A system for automatically determining the partial operational categories applicable to a logic chip having a group of logic circuits identifiable by a plurality of address bits comprising means for representing address bits of a logic circuit, registering means for representing partial memory categories for said chip to be eliminated, means responsive to said testing means for operating each of said registering means when its respective partial operational category is indicated to be inapplicable to a logic chip by the represented address of at least one bad logic circuit on the logic chip, and means for determining the partial operational categories applicable to the logic chip from said registering means.

12. A chip testing system in accordance with claim 11 wherein said registering means are operated in accordance with the address of a bad logic circuit before the address bits in said representing means are changed to identify another logic circuit.

* * * * *